United States Patent [19]

Tanaka

[11] Patent Number: 4,769,732
[45] Date of Patent: Sep. 6, 1988

[54] MAGNETIC TAPE CASSETTE

[76] Inventor: Masato Tanaka, c/o Sony Corporation, 7-35 Kitashinagawa 6-chome, Shinagawa-ku, Tokyo, Japan

[21] Appl. No.: 115,600

[22] Filed: Oct. 29, 1987

Related U.S. Application Data

[63] Continuation of Ser. No. 755,829, Jul. 17, 1985, abandoned.

[30] Foreign Application Priority Data

Jul. 28, 1984 [JP] Japan ............................ 59-115639[U]

[51] Int. Cl.⁴ .............................................. G11B 23/02
[52] U.S. Cl. ....................................... 360/132; 242/199
[58] Field of Search ................... 360/132, 60, 96.5, 93; 242/197, 199, 200

[56]  References Cited

U.S. PATENT DOCUMENTS

| 3,721,772 | 3/1973 | Miura et al. ......................... 360/132 |
| 4,012,011 | 3/1977 | Saito ............................... 360/132 X |
| 4,041,537 | 8/1977 | Kishi ..................................... 360/60 |

FOREIGN PATENT DOCUMENTS

| 2604172 | 8/1977 | Fed. Rep. of Germany ...... 360/132 |
| 0218085 | 12/1983 | Japan .................................. 360/133 |
| 2025899 | 1/1980 | United Kingdom ................ 360/132 |

Primary Examiner—Robert S. Tupper
Assistant Examiner—Andrew L. Sniezek
Attorney, Agent, or Firm—Lewis H. Eslinger

[57] ABSTRACT

A magnetic tape cassette has a housing with opposed surfaces and at least one passage extending through the housing and defining a cavity opening at apertures in such surfaces, and an indicating member movable within each passage and including a central positioning member in said cavity and opposed extensions directed from said positioning member into the apertures. The extensions are selectively actuable, as by a pencil point or the like, through the respective aperture for displacing the positioning member past a detent in the cavity from one to another of two externally detectable positions which correspond to respective states of the cassette.

8 Claims, 5 Drawing Sheets

MAGNETIC TAPE CASSETTE

This is a continuation of application Ser. No. 06/775,829, filed July 17, 1985, now abandoned.

BACKGROUND OF THE INVENTION

1. Field of the Invention

This invention relates to a cassette for housing therein a record medium such as magnetic tape, video film, or a magnetic disc.

2. Description of the Prior Art

A number of different types of record media are now available in cassette form. A primary example is magnetic tape for use in audio or video tape recorders, although magnetic disc, video film and the like are also available in cassettes. The cassette is easily stored and handled for recording and/or reproduction, and effectively protects the magnetic tape within.

It frequently happens that an operator will wish to preserve a particular recording, and many cassettes provide a protection mechanism which can be activated to prevent accidental erasure or rerecording on the tape within the cassette. In one such conventional protection mechanism, a window opening in the surface of the cassette is formed with a protective tab or nail member overlaying the same. When the tab is broken off, a lever within the tape recorder may enter the window and inhibit the recording or erasure of signals on the tape. For example, this may be achieved by having the lever either prevent a mechanical recording button from being depressed or inhibit the operation of an erasing and/or recording circuit.

Of course, the operator may then change his mind and desire to reuse the tape for a new recording. With the type of conventional cassette described above, the operator often covers the window with a piece of adhesive tape to thereby prevent the lever of the tape recorder from entering through the window, and so rerecording and erasure is again possible. A difficulty is that the adhesive tape must be changed frequently, since the lever is pressed against the adhesive tape with a predetermined biasing force which will weaken and ultimately break the adhesive tape. This raises the prospect of a second difficulty, which is that the adhesive tape may break during a recording operation, so that the lever would then enter the window and interrupt the recording. If the signal to be recorded is, for example, a special broadcast, and is not available for replay, this is a serious disadvantage.

A second type of magnetic tape cassette has been proposed in which the protective tab can be detached from and then reattached to the window as often as desired. When the operator wishes to prevent erasure or rerecording, he detaches the tab, and when he wishes to record, he attaches the tab back to the cassette. However, such tabs are quite small and are easily lost.

Therefore, a third type of magnetic tape cassette has been proposed which includes an accidental erasure protection mechanism which may be set and reset, and does not include removable pieces. An example of such cassette is disclosed in Japanese Utility Model Application No. 163086/1983, published Oct. 29, 1983. In this cassette, there are two passages formed through the cassette housing. A central cavity in each passage has two subcavities separated by a detent, and a position indicating member in the form of a ball is located within each cavity and may be moved within the passage from one subcavity to the other past the detent by pressure exerted on the ball by a slender prong inserted through apertures at the ends of the passage. The ball in each passage is prevented by the detent from being inadvertently moved from one subcavity to the other. The positions of the balls within the respective passages may be detected through a window in the housing. This permits the operator to confirm the present state of the cassette and to select a new state, if desired, and the balls also serve, when in a predetermined particular position, to prevent the lever of the tape recorder from effectively entering the housing. This accidental erasure mechanism may be set and reset, and the balls can not be lost.

However, the apertures in the housing must be relatively long and narrow, so that the prong used to move each ball from one subcavity to another must also be long and thin. This makes it impossible to use such common articles as ballpoint pens or mechanical pencils as the prong. If the depth of the apertures is reduced, the balls would have to be relatively large to occupy the height of the cassette. However, they would then occupy a considerable volume within the cassette, which is disadvantageous since the cassette housing is generally filled by the tape and the reels on which it is wound.

OBJECTS AND SUMMARY OF THE INVENTION

Accordingly, it is an object of the present invention to provide a record medium cassette for holding magnetic tape or the like and which avoids the above-described difficulties of the prior art.

It is another object of the present invention to provide a record medium cassette having a number of operating states and which includes an easily operated and resettable mechanism for adapting the cassette for a selected one of these operating states and for indicating the same.

It is yet another object of the present invention to provide a record medium cassette of the above type with a resettable mechanism, as aforesaid, which may be actuated by means of readily available consumer products such as pens and pencils.

It is a further object of the present invention to provide a record medium cassette of the above type having an upper half and a lower half which may be produced by injection molding using a simply constructed mold.

In accordance with the present invention, a record medium cassette of the type having at least two different operating states comprises a housing having opposed first and second surfaces, the housing further having at least one passage extending therethrough and opening at first and second apertures in the first and second surfaces, respectively, and a cavity connecting the first and second apertures. The cassette further comprises an indicating member moveable within each passage and including a central positioning member and first and second extensions extending therefrom and receivable within the first and second apertures, respectively, the indicating member being displaceable by selective actuation of the first and second extensions between first and second externally detectable positions within the passage for indicating first and second operating states, respectively, of the cassette.

In a first preferred embodiment, the indicating member includes a central spherical positioning member and the extensions are frustoconical and connected, at their smaller diameter end portions, to the positioning member while the larger diameter end portions of the extensions extend through respective apertures to be flush with one or the other outer surface of the housing when the indicating member is in respective one of the detectable positions. In another preferred embodiment, the passage and the indicating member are both rectangular in crosssection, so that the upper and lower halves of the cassette housing may be formed by injection molding using a simply constructed mold.

The above, and other objects, features and advantages of the present invention, will become apparent from the following detailed description of the preferred embodiments taken in conjunction with the accompanying drawings, in which the same reference numerals designate like elements and parts.

DETAILED DESCRIPTION OF THE PREFERRED EMBODIMENTS

Figure 1:
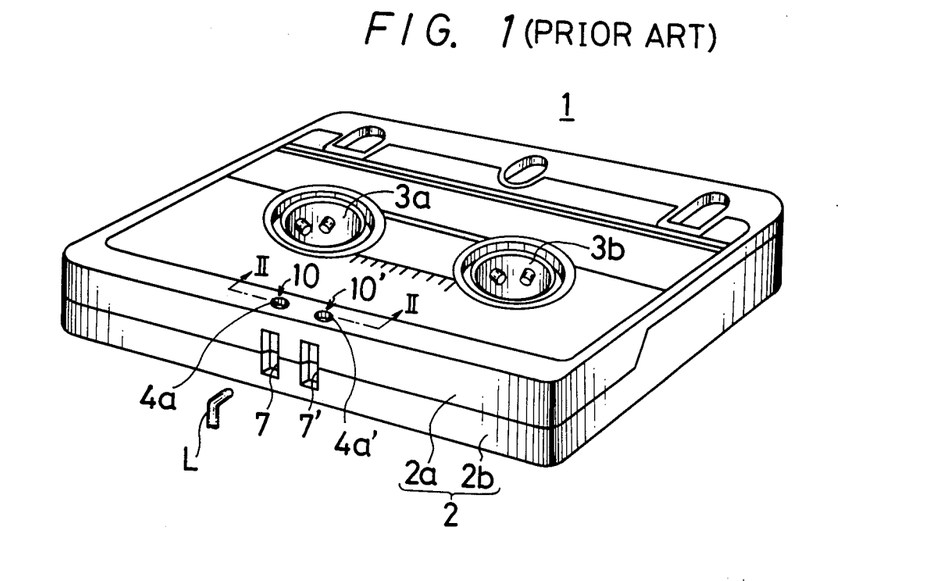
FIG. 1 is a perspective view of a prior art magnetic tape cassette.

Referring to the drawings in detail, and initially to FIG. 1 thereof, it will be seen that a magnetic tape cassette 1 of the type disclosed in previously mentioned Japanese Utility Model Application No. 163086/1983, includes a cassette housing 2 formed of an upper half 2a and a lower half 2b. Housing 2 encloses therein a magnetic tape (not illustrated) as the record medium. As is conventional, housing 2 includes a pair of reel shaft insertion openings 3a, 3b, formed through both upper and lower halves 2a, 2b.

Apertures 4a, 4a' are formed in the upper half 2a to constitute the upper openings of two passages 10, 10' through housing 2. As may be seen in FIG. 2, lower apertures 4b, 4b' are formed in lower half 2b as the lower openings of passages 10, 10', respectively. The pairs of apertures 4a, 4b and 4a', 4b' are opposed in the vertical direction of housing 2 and are centrally located at the rear portion of the housing. A cavity 5 connects apertures 4a, 4b of passage 10, and a cavity 5' connects apertures 4a', 4b' of passage 10'. Each cavity 5, 5' is divided into upper and lower subcavities 5a, 5b and 5a', 5b', respectively, separated by detents 6, 6' which project inwardly so as to constrict cavities 5, 5', respectively. Window openings 7, 7' are formed in the rear marginal surfaces of upper half 2a and lower half 2b and communicate with cavities 5, 5', respectively.

Figure 2:
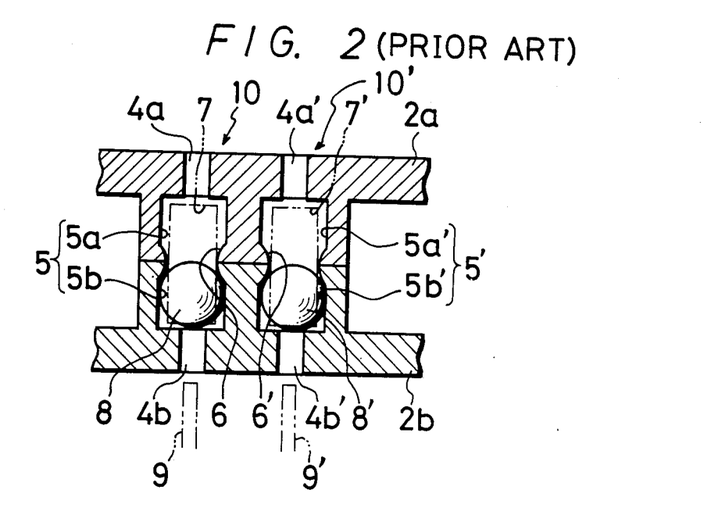
FIG. 2 is an enlarged, fragmentary view of the magnetic tape cassette of FIG. 1, taken along line II—II in FIG. 1.

As shown in FIG. 2, indicating members 8, 8' in the shape of balls are respectively located in cavities 5, 5'. As the two indicating members 8, 8' are identical, the following description will refer only to indicating member 8 within passage 10, although such description applies equally to indicating member 8' within passage 10'. Indicating member 8 fits within either one of subcavities 5a, 5b and is prevented from inadvertent movement between the two by detent 6. Indicating member 8 is moveable from subcavity 5b to subcavity 5a by means of pressure exerted thereon by an external member such as a prong 9 inserted through aperture 4b. The pressure exerted thereby in the upward direction of FIG. 2 will cause indicating member 8 to slide upwardly, causing the wall formed with detent 6 to move or flex outwardly and thereby allow indicating member 8 to pass by detent 6 into subcavity 5a. Cavity 5 is constructed so that the wall thereof is suitable for this purpose. Correspondingly, indicating member 8 may be moved back to subcavity 5b by inserting prong 9 through aperture 4a and exerting pressure in the downward direction of FIG. 2.

One of the positions of member 8 in subcavity 5a or 5b may be predetermined to intercept the motion through window 7 of an operating lever L (FIG. 1) of a tape recorder. If indicating member 8 is in that one predetermined position when cassette 1 is placed in the tape recorder, lever L is prevented from entering cassette 1, and so erasure and recording are prevented.

Prior art cassette 1 illustrated in FIGS. 1 and 2 has a distinct advantage over the prior well-known cassette (not shown) having a detachable tab. Each of indicating members 8,8' of cassette 1 is independently moveable between two positions, which are externally detectable through windows 7, 7'. The operator may look into these windows 7, 7' to observe the indicated operating state, either to assure himself that it is the proper state or to change it to the proper state if necessary. Indicating members 8, 8' can also be used to limit the entry of lever L of a tape recorder into cassette 1. Since indicating members 8, 8' are never removed from cavities 5, 5', they cannot be lost.

However, there is a problem with the magnetic tape cassette 1 stemming from the nature of indicating members 8, 8'. As described above, these indicating members 8, 8' are moved between two respective positions by exerting pressure thereon through apertures 4a, 4a', 4b, 4b' by means of a suitable prong 9. It is will known that operators are likely to use whatever is handy, such as a ballpoint pen or a mechanical or regular pencil, for this purpose. However, indicating members 8, 8' are fairly small spheres, and apertures 4a, 4a', 4b, 4b' must have small diameters to prevent indicating members 8, 8' from falling out. Consequently, apertures 4a, 4a', 4b, 4b' are relatively long and narrow, with the result that a standard ballpoint pen or pencil will not fit all the way through to reach indicating members 8, 8'. Although special prongs could be provided for this purpose, this significantly reduces the convenience of the magnetic tape cassette 1.

Of course, it is possible to make apertures 4a, 4a' 4b, 4b' larger and shallower by making indicating members 8, 8' larger. However, in that case, the cavities 5, 5' must also be large, and generally cassette housings have relatively little vacant space available therein for accommodating the indicating members.

Referring now to FIGS. 3–6, it will be seen that a record medium cassette 11 according to this invention which eliminates the above-described difficulties of the prior art cassettes, is there provided for magnetic tape, but it will be understood that the present invention can be similarly advantageously applied to cassettes housing many different types of record media, such as, magnetic discs and video film.

Figure 3:
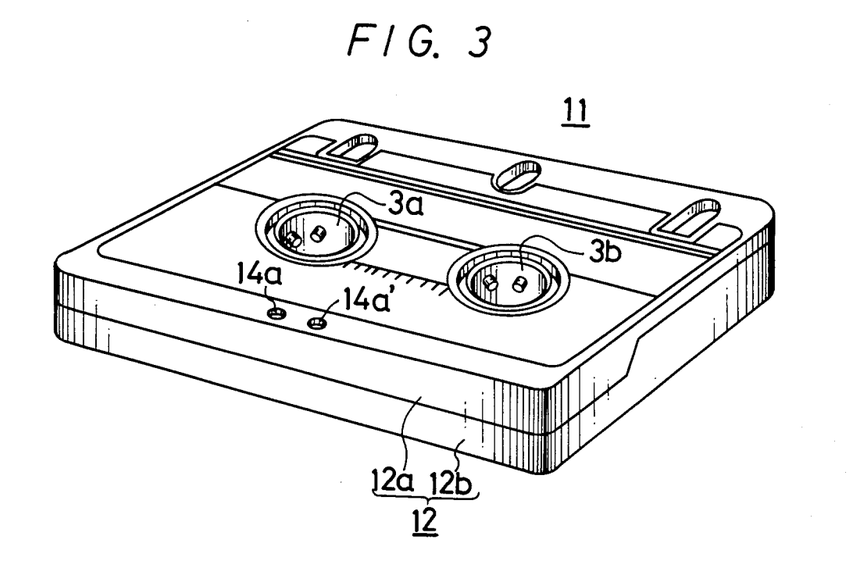
FIG. 3 is a perspective view of a record medium cassette according to a first embodiment of the present invention.

Referring now to FIG. 3, it will be seen that cassette 11 according to the present invention includes a housing 12 made up of upper and lower halves 12a, 12b having the usual first and second reel shaft insertion apertures 3a, 3b. Upper apertures 14a, 14a' are provided in upper half 12a at a central location in the back portion of housing 12. It should be noted that the windows 7, 7' in the peripheral wall of housing 2 of prior art cassette 1 are not necessary in the cassette 11 according to this invention, as will be described below, and so are not provided.

Figure 5:
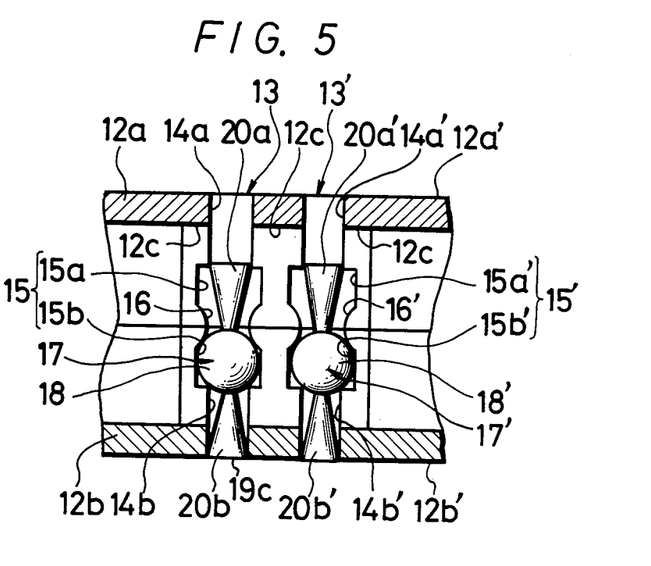
FIG. 5 is an enlarged fragmentary view of the cassette of FIG. 3, as viewed along the line V—V on FIG. 4.

As shown in FIG. 5, housing 12 of cassette 11 is formed with passages 13, 13' with indicating members 17, 17' respectively located therein. As passages 13, 13' are identical, and indicating members 17, 17' are identical, the following description will be given in respect to indicating member 17 within passage 13, and it will be appreciated that the description applies equally to indicating member 17' within passage 13'.

Passage 13, similarly to passage 10 of prior art cassette 1, includes a cavity 15 with first and second subcavities 15a, 15b separated by a detent 16. Aperture 14a and a corresponding lower aperture 14b in lower half 12b of the housing connect with cavity 15. The lower apertures 14b, 14b' are also shown on FIG. 4.

Figure 6:
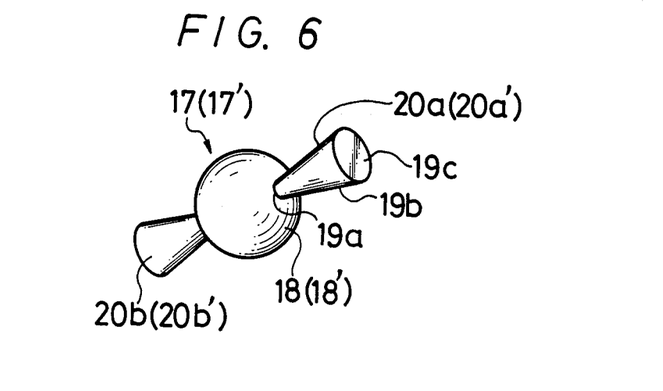
FIG. 6 is a perspective view of an indicating member included in the cassette of FIG. 3.

As most clearly seen in FIG. 6, indicating member 17 includes a central positioning member 18, and also two extensions 20a, 20b extending therefrom in opposite directions. In the first embodiment being here described, positioning member 18 is substantially spherical, while each extension 20a, 20b is frustoconical and connected to positioning member 18 at its respective relatively small diameter end portion 19a. Each larger diameter end portion 19b terminates in a flat surface 19c. As shown in FIG. 5, indicating member 17 is located within passage 13, with extensions 20a, 20b being respectively receivable in apertures 14a, 14b. In the position illustrated in FIG. 5, indicating member 17 has its positioning member 18 within second subcavity 15b, and second extension 20b is received within aperture 14b such that its terminating flat surface 19c is substantially flush with the outer surface 12b' of lower half 12b. Second extension 20b is actuable by the application of pressure to its surface 19c through aperture 14b by means of some external device to urge positioning member 18 in the upward direction, as viewed in FIG. 5, past detent 16 into first subcavity 15a. Such pressure on second extension 20b is easily applied by virtue of the fact that its terminating flat surface 19c is flush with and immediately available directly at the surface 12b' of housing 12, so that a ball point pen or pencil may be used to apply the necessary pressure thereto. This presents a distinct advantage over cassette 1 of FIG. 1, for which such common and conveniently available items could not be used to apply pressure to move indicating element 8 from one position to another.

It will be appreciated that when second extension 20b has been actuated to displace indicating member 17 to its upper position with positioning member 18 in first subcavity 15a, the terminating flat surface 19c of its first extension 20a will now be substantially flush with the outer surface 12a' of upper half 12a. These positions of indicating member 17 are externally detectable through apertures 14b, 14b' for two purposes. The operator may view cassette 11 with a specific orientation, such as, from lower half 12a, and from observing whether none, one or both of lower apertures 14b, 14b' are filled, i.e. whether the flat surfaces 19c of extensions 20b, 20b' are flush with outer surface 12b' of lower half 12b, the operator is able to determine the operating states of cassette 11. As described above, one operating state of cassette 11 may be one in which it is intended that a signal may be recorded on the magnetic tape held within housing 12, and a second operating state may be one in which it is intended that such recording is to be avoided. By observing the positions of indicating members 17, 17', the operator can readily determine which operating states are indicated. He may then, if desired, suitably actuate one or more of members 17, 17' to select the other operating states.

In addition, if cassette 11 is to be used in a tape recorder having a sensing lever (similar to that sensing lever L in FIG. 1) which may penetrate cassette 11 to selectively permit or prevent the recording of a signal on the magnetic tape within housing 12, the selected positions of indicating members 17, 17' will respectively block or permit such entry of the control or sensing levers into cassette 11. Thus the positions of indicating members 17, 17' serve a dual purpose, namely, to indicate the operating state of cassette 11 to the operator and to a recording/reproducing apparatus with which it may be used.

Cassette 11 may be of a type in which the operating state is to be determined with cassette 11 in one orientation only. For example, the record medium may have only single side recording capacity, so that cassette 11 must be inserted into a recording/reproducing apparatus in a particular orientation.

In that case, only a single indicating member 17 in passage 13 is required to indicate, in one position thereof, for example, with its extension 20b flush with surface 12b' and its extension 20a recessed in aperture 14a, that recording is permissible, whereas, in the other position of indicating member 17 in which extension 20a is flush with surface 12a', it is indicated that recording is impermissible.

In the event that the record medium can be recorded on two sides, for example, as in a conventional magnetic tape cassette, the two indicating members 17, 17' are required to indicate that recording is, or is not permissible in a first track and in a second track, respectively, on the magnetic tape. For example, indicating members 17 and 17' may be positioned as shown on FIG. 5 for indicating that recording is permitted in the first track and is not permitted in the second track on the magnetic tape contained in cassette housing 12. When cassette 11 is disposed in a recording/reproducing apparatus with its housing half 12a uppermost for recording or reproducing in the first track, the recessed condition of extension 20a of member 17 in aperture 14a is detected by a suitable sensing lever (not shown) to permit recording in the first track on the tape. However, when cassette 11 is inverted, that is, inserted in the recording/reproducing apparatus with its housing half 12b uppermost, for recording or reproducing in the second track, the sensing lever detects that extension 20b' is flush with surface 12b' and, accordingly, recording in the second track is not permitted. Therefore, the two indicating members 17,17' make it possible to indicate four operating states, and it will be apparent that additional states can be indicated by providing suitable additional indicating members similar to the member 17 and 17'. Such additional indicating members may indicate the nature of the record medium, for example, the material forming the magnetic coating on the tape, and/or the equalization or other characteristics with which the tape has been recorded.

Figure 4:
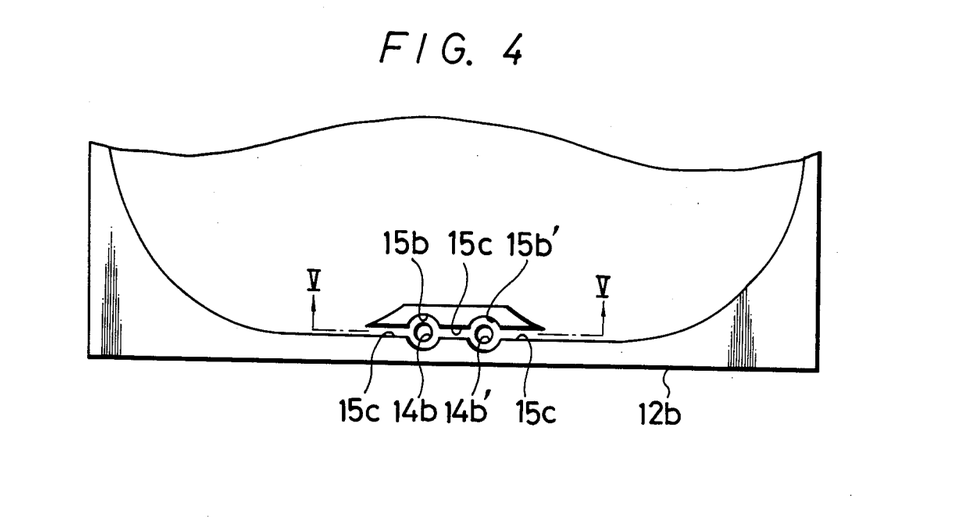
FIG. 4 is a plan view of a portion of the lower half of the housing of the cassette of FIG. 3.

As is most clearly seen in FIGS. 4 and 5, grooves or slots 15c extend from and between cavities 15,15'. Grooves or slots 15c have a predetermined height from the inner surface at which upper half 12a contacts lower half 12b of the housing. These grooves 15c permit the walls defining cavities 15,15' to be resiliently deformable or to flex for allowing the passage of positioning members 18, 18' past detents 16, 16'. The operator will feel a distinct releasing sensation when any one of positioning members 18, 18' moves past detent 16 or 16' into a new position, which serves to confirm by feel that the indicated state of cassette 11 has been changed.

Figure 7:
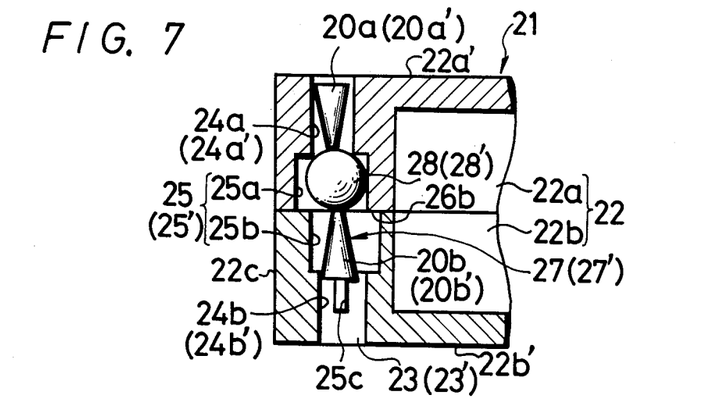
FIG. 7 is an enlarged fragmentary view of a record medium cassette according to a second embodiment of the present invention, as viewed along the line VII—VII on FIG. 9.
Figure 8:
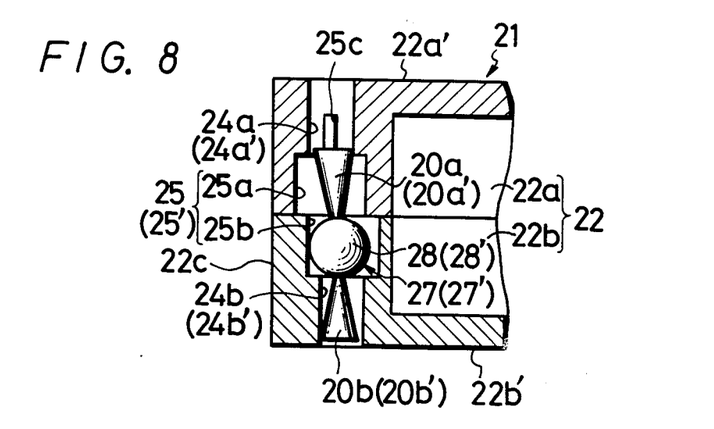
FIG. 8 is a view similar to that of FIG. 7, but illustrating an indicating member in another position thereof.
Figure 9:
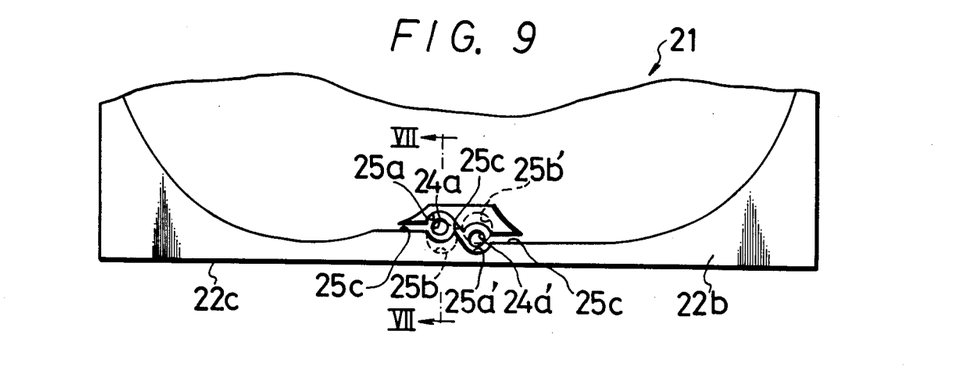
FIG. 9 is a plan view of a lower portion of the housing of the cassette of FIGS. 7 and 8.

A record medium cassette 21 according to a second preferred embodiment of the present invention is shown in FIGS. 7–9 to include a housing 22 divided into upper and lower halves 22a,22b, with two passages 23,23' extending therethrough with respective indicating members 27, 27' movable therein. Since the two passages 23, 23' are identical and indicating members 27, 27' are identical, only indicating member 27 within passage 23 will be described. Passage 23 is defined by upper and lower apertures 24a, 24b in upper and lower halves 22a,22b, respectively, with a connecting cavity 25 therebetween divided into two subcavities 25a, 25b. The portion of passage 23 in upper half 22a, consisting of aperture 24a and subcavity 25a, has its axis displaced or offset relative to the axis of the portion of passage 23 in lower half 22b, consisting of aperture 24b and subcavity 25b, in a direction perpendicular to the rear portion of the peripheral wall 22c of cassette housing 22. Further, as illustrated in FIG. 9, upper apertures 24a, 24a' in upper half 22a are shifted relative to each other in the direction perpendicular to the rear portion of the peripheral wall 22c of cassette housing 22 by a predetermined amount, and lower apertures 25b, 25b', illustrated in phantom or dashed lines in FIG. 9, are oppositely shifted by the same predetermined amount to be laterally aligned with apertures 24a', 24a, respectively. This provides symmetry between upper and lower halves 22a, 22b, so that cassette 21 may indicate its state from either of its sides. Again, this enables cassette 21 to be inserted both ways into a tape recorder. In this embodiment, a detent-like structure is provided between subcavities 25a, 25b by shoulders 26a,26b of the relatively offset subcavities 25a, 25b. Thus, protruding detents, such as detents 16,16' in FIG. 5, need not be provided and the production of the two halves 22a,22b is facilitated.

Each indicating member 27,27' utilized in this embodiment is similar to indicating member 17,17' of the first described embodiment in having a spherical central positioning member 28 and two frustoconical extensions 20a, 20b. The lateral distance between shoulders 26a,26b must, of course, be slightly less than the diameter of positioning member 28 to prevent inadvertent movement of member 28 from a position in and of subcavities 25a,25b to a position in the other subcavity in the absence of actuation. Terminating surfaces 29a, 29b of extensions 20a, 20b are substantially flush with outer surfaces 22a',22b', respectively, of upper and lower halves 22a,22b in the respective positions of indicating member 27. It will be seen from observing FIGS. 7 and 8, which respectively illustrate indicating member 27 in its two positions, that a sideways or lateral shift, as well as a vertical movement, is effected during movement from one position to the other. To accommodate this slight sideways shift, the diameters of apertures 24a, 24b may be made slightly larger than the diameter of the larger diameter end portions of frustoconical extensions 20a, 20b, as illustrated.

As in the first embodiment, a plurality of grooves or slots 22c extend from and between cavities 25,25' to allow the walls defining cavities 25, 25' to be resiliently deformable for allowing passage of positioning member 28 past shoulders 26a, 26b.

Figure 10:
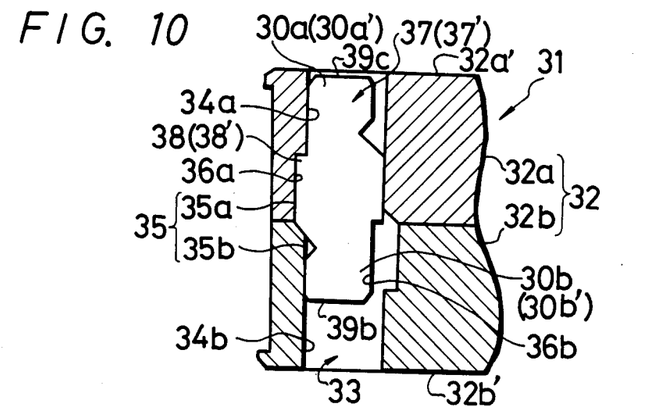
FIG. 10 is an enlarged fragmentary view similar to that of FIG. 7, but showing a record medium cassette according to a third embodiment of the present invention.
Figure 11:
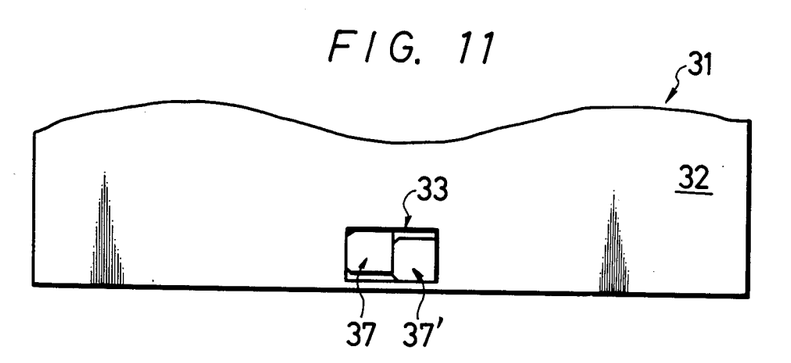
FIG. 11 is a top plan view of a portion of the cassett of FIG. 10.
Figure 12:
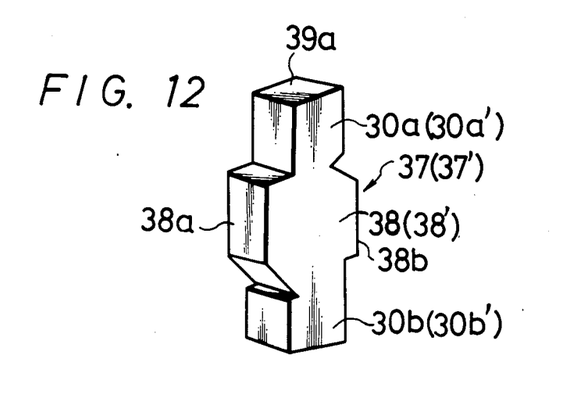
FIG. 12 is a perspective view of an indicating member included in the cassette of FIGS. 10 and 11.

A record medium cassette 31 according to a third preferred embodiment of the present invention is shown in FIGS. 10–12 to include a housing 32 made up of upper and lower halves 32a,32b having a single passage 33 extending therethrough and accommodating two indicating members 37,37'. In this embodiment, the crosssection of passage 33 is rectangular (FIG. 11), and the crosssection of each indicating member 37,37' (FIG. 12) is also generally rectangular. The indicating members 37,37' are arranged side-by-side in passage 33 and are slidable relative to each other. Apertures 34a, 34b and cavity 35 define the continuous passage 33 through housing 32. Cavity 35 is divided into two subcavities 35a, 35b by two positioning recesses 36a, 36b in the wall surfaces thereof for respectively defining the two positions for each of indicating member 37,37'. Each indicating member 37,37' has a central positioning member 38,38' and first and second extensions 30a,30b or 30a',30b' which are respectively receivable into apertures 34a, 34b. Terminating surfaces 39a, 39b of extensions 30a,30b or 30a',30b' are substantially flush with outer surfaces 32a',32b' of the upper and lower halves 32a,32b, at respective positions of the indicating members 37,37'. Each positioning member 38,38' includes two position-defining members 38a,38b which selectively matingly engage the first and second positioning recesses 36a, 36b respectively, of the wall surface at the first and second positions, respectively, of indicating member 37,37'. Thus, positioning recesses 36a, 36b function as a detent to prevent inadvertent movement of indicating member 37,37' from one to another of its positions.

As the indicating member 37,37' is moved from one position to the other, a wall surface defining cavity 35 is resiliently deformable or capable of flexing, for example, by providing slots or grooves (not shown), to allow the passage of positioning member 38,38' therethrough. Consequently, a release will be felt by the operator as indicating member 37,37' moves into its new position, confirming by feel the change of indicated state.

The third embodiment has additional advantages. First, positioning recesses 36a, 36b may be relatively shallow, so that extensions 30a, 30b or 30a',30b' need to be depressed for only a short distance to cause indicating member 37,37' to move to a new position. Second, as with the embodiment of FIGS. 7–9, there is no need for a protruding detent to be molded into the wall surfaces defining passage 33 so that halves 32a,32b may be manufactured by injection molding using a mold which is simply constructed. Finally, indicating members 37,37' and passage 33 which slidingly receives both indicating members may be made quite narrow (FIG. 11), thus reducing the space required to accommodate them within housing 2.

In accordance with the present invention, a cassette for magnetic tape or other record medium which has at least two operating states or conditions includes a convenient and easily operated mechanism for indicating which of the operating states or conditions are in existence. The indicating members within the passage or passages may be moved from one position to another and back again at will, so that the operating state may be freely chosen. The indicating members are always contained within the cassette, and so they cannot become lost. The extensions of each indicating member terminate in flat surfaces which selectively lie relatively close to, and advantageously are flush with, the respective outer surfaces of the housing of the cassette, so as to be easily accessible and actuable by means of commonly available implements, such as ballpoint pens or pencils.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A record medium cassette of the type having at least two different operating states, comprising:
   a housing having opposed first and second surfaces corresponding, respectively, to top and bottom sides of said cassette;
   said housing further having at least one passage extending therethrough between said surfaces and being defined by first and second apertures opening at said first and second surfaces, respectively, and a cavity connecting said first and second apertures; and
   an indicating member moveable between said top and bottom sides within said passage and including a central spherical positioning member and first and second extensions extending therefrom in diametrically opposed relationship and receivable within said first and second apertures, respectively, said extensions being longitudinally dimensioned so that one of said first and second extensions remains within the cavity when the other of said extensions is positioned in said respective opening substantially flush, at an end surface thereof, with the respective one of said surfaces of the housing;
   said indicating member being displaceable by selective actuation of said first and second extensions at the respective end surfaces thereof between first and second externally detectable positions within said passage and at which said end surfaces of the first and second extensions are substantially flush with, and readily visible at said first and second surfaces corresponding to the top and bottom sides for indicating first and second operating states, respectively, of said cassette, and
   retaining means within said passage engageable with said positioning member for releasably retaining said indicating member in a selected one of said positions thereof.

2. A record medium cassette according to claim 1, further comprising a plurality of grooves extending along said passage to permit resilient deformation thereof and release of said retaining means upon movement of said spherical positioning member in said passage.

3. A record medium cassette according to claim 1, wherein said first and second extensions are frustoconical and connected to said central positioning member at their respective relatively small diameter end portions.

4. A record medium cassette according to claim 3, wherein said first and second apertures are cylindrical and of diameters sufficient to slidingly receive large diameter end portions of said frustoconical extensions.

5. A record medium cassette according to claim 4; wherein said cavity includes first and second subcavities for receiving said positioning member at said first and second positions, respectively, said first and second subcavities are each defined by a cylindrical wall surface having a diameter equal to a diameter of said positioning member, said first and second subcavities are axially offset from one another by a predetermined distance in a direction parallel to said first and second surfaces of said housing, and the cylindrical wall surfaces defining said first and second subcavities are resiliently deformable to permit passage of said positioning member between said first and second subcavities upon actuation of said extensions.

6. A record medium cassette according to claim 4, wherein said cavity is defined by a cylindrical wall surface of a first diameter substantially equal to a diameter of said positioning member and having a central annular portion of reduced diameter to constitute said retaining means and to divide said cavity into first and second subcavities for receiving said positioning member at said first and second positions, respectively, and said wall surface is resiliently deformable to permit the movement of said positioning member past said retaining means between said subcavities upon selective actuation of said extensions.

7. A record medium cassette according to claim 5, wherein each said cylindrical wall surface includes a plurality of grooves formed therein, whereby said wall is made resiliently deformable.

8. A record medium cassette of the type having at least two different operating states, comprising:
   a housing having opposed top and bottom surfaces;
   at least one passage extending through said housing and being defined by first and second apertures opening at said top and bottom surfaces, respectively, and a cavity connecting said first and second apertures; and
   an indicating member moveable longitudinally within said passage including a central positioning member and first and second extensions extending in opposite directions therefrom and receivable within said first and second apertures, respectively, said extensions being longitudinally dimensioned so that one of said first and second extensions remains within the cavity when the other of said extensions is positioned in said respective opening substantially flush, at an end surface thereof, with the respective one of said surface of the housing;

said passage having a wall surface of substantially rectangular cross-section with first and second selective positioning recesses in said wall surface, said indicating member being of substantially rectangular cross-section to be slidingly received in said passage and including first and second position-defining members for selective mating engagement in said first and second positioning recesses, respectively, of said wall surface of the passage;

said indicating member being displaceable by selective actuation of said first and second extensions at the respective end surfaces thereof between first and second externally detectable positions within said passage and at which said end surfaces of the first and second extensions are substantially flush with, and readily visible at said top and bottom surfaces, respectively, for indicating first and second operating states, respectively, of said cassette while said first and second position-defining members selectively engage in said first and second positioning recesses respectively for retaining said indicating member as the selected one of said first and second externally detectable positions.

* * * * *